United States Patent [19]
Sturdivant

[11] Patent Number: 5,615,773
[45] Date of Patent: Apr. 1, 1997

[54] ARRANGEMENT FOR RETAINING AND TRANSPORTING AUDIO TAPE CASSETTE CASES

[76] Inventor: Roxanne Sturdivant, 213 S. Harrison St., Apt. 3N, East Orange, N.J. 07018

[21] Appl. No.: 569,575

[22] Filed: Dec. 8, 1995

Related U.S. Application Data

[63] Continuation-in-part of Ser. No. 376,939, Jan. 23, 1995, abandoned.

[51] Int. Cl.$^6$ .................................................. B65D 85/575
[52] U.S. Cl. ...................... 206/387.1; 220/23.2; 220/4.27
[58] Field of Search ............................... 206/307, 307.1, 206/308.1–308.3, 387.1, 387.12, 387.15, 460; 220/4.27, 23.2, 23.4, 23.6, 23.8, 23.83, 23.86

[56] References Cited

U.S. PATENT DOCUMENTS

| | | | |
|---|---|---|---|
| 2,726,004 | 12/1955 | McLeod | 220/23.2 |
| 3,103,278 | 9/1963 | Kuzma et al. | 220/23.6 |
| 3,202,272 | 8/1965 | Hertzog | 206/461 |
| 3,520,439 | 7/1970 | Smith et al. | 220/23.4 |
| 4,919,293 | 4/1990 | Buckley | 220/23.2 |
| 4,951,826 | 8/1990 | Tompkins | 206/308.1 |
| 5,291,990 | 3/1994 | Sejzer | 206/308.3 |
| 5,392,906 | 2/1995 | Taniyama | 220/4.27 |

FOREIGN PATENT DOCUMENTS

| | | | |
|---|---|---|---|
| 2836533 | 2/1980 | Germany | 206/460 |
| 537852 | 7/1941 | United Kingdom | 206/460 |

*Primary Examiner*—Jimmy G. Foster
*Attorney, Agent, or Firm*—Anthony F. Cuoco; Siegmar Silber

[57] ABSTRACT

A plurality of audio tape cassette cases are arranged in a stack and the stack is held together via several loop or pile fastener members attached to the stack. The arrangement is such that selected cases in the stack can be easily displaced from adjacent cases while maintaining the stacked relationship. A cover having engaging loop or pile fastener members attached thereto adheres to the stack via said engaging members. The cover is arranged so that the covered stack is easily transportable from one place to another, and the cover is easily removable from the stack.

6 Claims, 2 Drawing Sheets

5,615,773

ARRANGEMENT FOR RETAINING AND TRANSPORTING AUDIO TAPE CASSETTE CASES

CROSS REFERENCE TO RELATED APPLICATIONS

This application is a continuation-in-part of U.S. application Ser. No. 08/376,939, filed by the present inventor on Jan. 23, 1995, abandoned.

BACKGROUND OF THE INVENTION

This invention relates generally to audio tape cassettes (tapes) and the like, such as are generally disposed in cases when not in use. More particularly, this invention relates to an arrangement for retaining and transporting the cases, either with the tapes disposed in the cases, or with said tapes removed therefrom for use.

Audio tape cassettes of the type described are in wide use for entertainment, educational, business and other purposes. Accordingly, the importance of retaining these devices in some form of order will be appreciated. For example, it may be desireable to retain a plurality of audio cassettes relating to a particular style of music for easy access to the cassettes without undue searching for a particular rendition, as may be the case. Also, it is desireable to prevent loss or misplacement of a cassette case when the tape is removed therefrom for use so that the tape can be replaced in the case when said use has ceased.

Further, prior to the present invention, equipment for retaining and transporting audio cassette cases has been in the form of trays, cabinets and other unwieldy equipment which is not particularly portable so as to readily lend itself to transporting a plurality of such cases from one place to another. It will be recognized that this portability feature is important to those who use audio tape cassettes on a regular basis for the purposes noted above.

The present invention overcomes these disadvantages by providing an arrangement for retaining and transporting audio tape cassette cases so that the cases are readily accessible and are portable in a form of order or the like, as is desireable.

SUMMARY OF THE INVENTION

This invention contemplates an arrangement for retaining and transporting audio tape cassette cases which utilizes the features of adhesive backed fasteners having loop and pile members. A plurality of cases are arranged in a stack and the stack is held together via several such loop or pile members attached to the stack. The arrangement is such that the stacked cases can be individually displaced from one another while maintaining the stacked relationship, whereby the contents of a particular case in the stack are made readily available for use and the case remains in its original position in the stack so that the contents can be easily replaced. A cover having engaging members of the loop or pile members attached thereto adheres to the stack via said engaging members. The cover may carry a handle so that the entire stack is easily transportable from one place to another and the handle may carry a strap for enhancing the portability of the arrangement.

DETAILED DESCRIPTION OF THE INVENTION

Figure 3:
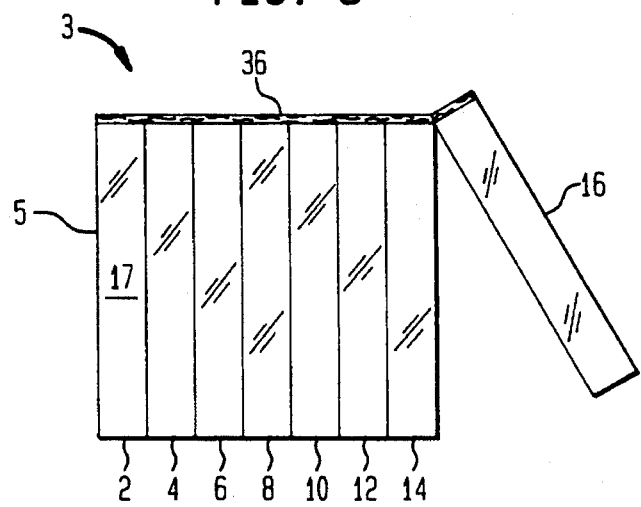
FIG. 3 is a diagrammatic side view representation of the audio cassette case stack particularly illustrating the displacement of one of the cases from the others of said cases in accordance with the invention.
Figure 4:
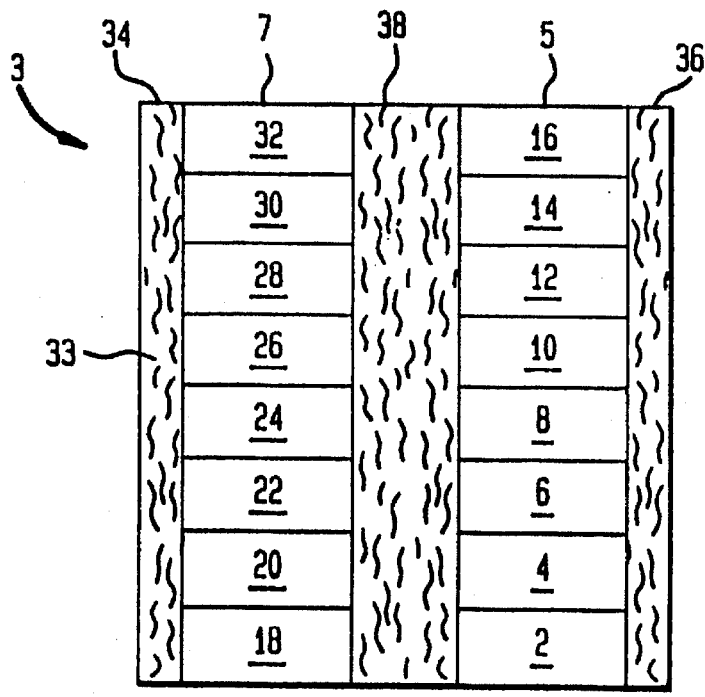
FIG. 4 is a diagrammatic top plan view representation showing an audio tape cassette case stack in accordance with the invention.

A plurality of cases for audio cassettes, are shown as eight in number and carry the numerical designations 2–32, as particularly shown in FIG. 4. FIG. 4 shows a generally rectangular stack 3 of cases arranged in two parallel rows 5 and 7 of equal case numbers. Row 5 includes cases 2–16 and row 7 includes cases 18–32. Row 5 including cases 2–16 is particularly shown in the side views of FIGS. 2 and 3 and cases 2 and 18 of rows 5 and 7, respectively, are particularly shown in the end view of FIG. 1. Storage device cases 2–32 are arranged in stack 3 in adjacent relationship.

Although case stack 3 is shown as including, for purposes of example, two rows of eight cases each, it will be appreciated that additional rows and additional cases in each row are contemplated by the invention as well. Also, cases 2–32 are arranged in stack 3 so that the fronts of the cases such as 15 in FIG. 1 face inwardly and the backs such as 17 face outwardly. Case fronts 15 open for removal of the contents (tapes) of the cases and replacement thereof.

The top view of FIG. 4 best shows the arrangement of the invention wherein members such as, for example, loop members of a fastener arrangement including loop and pile members are used to maintain rows 5 and 7 of media storage device cases in stack 3. Thus, a loop member 34 extends from one end of stack 3 to the other end thereof along a side of the stack adhering thereto via an adhesive surface 37 shown in FIG. 1 opposite loop surface 33 of member 34 to cases 18–32 in row 7. A like loop member 36 is disposed along the other side of the stack in parallel relation to member 34 and adhesively adheres to cases 2–16 in row 5. A loop member 38, which in the preferred embodiment of the invention is somewhat wider than loop members 34 and 36, extends in parallel relation to loop members 34 and 36 between said members, and adheres to the cases in both rows 5 and 7, i.e. cases 2–16 and cases 18–32.

Figure 1:
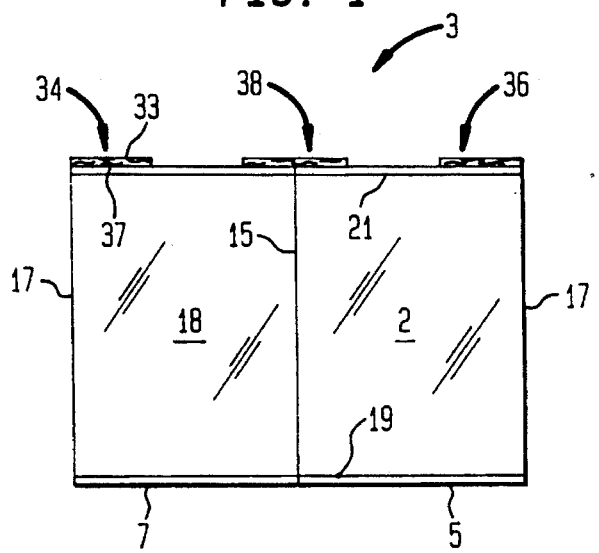
FIG. 1 is a diagrammatic end view representation of a stack of audio tape cassette cases in accordance with the invention.
Figure 2:
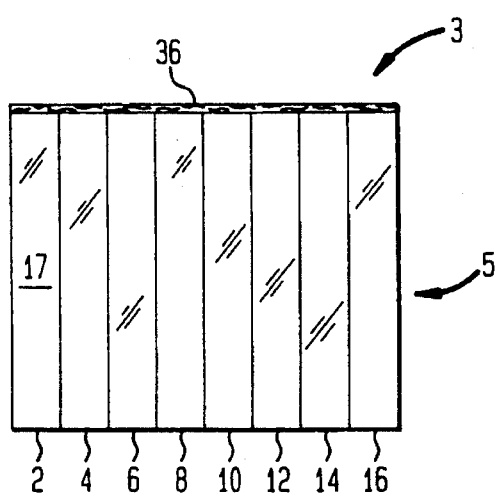
FIG. 2 is a diagrammatic side view representation thereof.

Loop member 36 is shown in the side views of FIGS. 2 and 3 and loop members 34, 36 and 38 are shown in the end view of FIG. 1.

With reference now to FIG. 3, it will be appreciated that the inherent flexibility of loop members 34, 36 and 38 enables selected cases of the several cases 2–32 to be displaced from one another for easy access to the contents of the selected cases without destroying the stacked relationship thereof.

Thus, FIG. 3 shows, for purposes of example, case 16 which is displaced from adjacent cases in row 5 containing cases 2–16 so that an audio cassette disposed in case 16 may be easily removed therefrom and replaced therein, while maintaining the aforementioned stacked relationship. It will be appreciated that any or all of the cases in stack 3, as the case may be, can be easily displaced from adjacent cases for easy access to the contents of the displaced cases.

With particular reference to FIG. 1, case fronts 15 nest between the bottoms 19 and the tops 21 of case backs 17. This avoids contact between the case fronts and loop members 34, 36 and 38 and enables the case fronts to be opened and closed for removal of the tapes and replacement thereof, respectively, without obstruction from the loop members via conventional pivots or hinges as is well known in the art and not otherwise shown.

Figure 5:
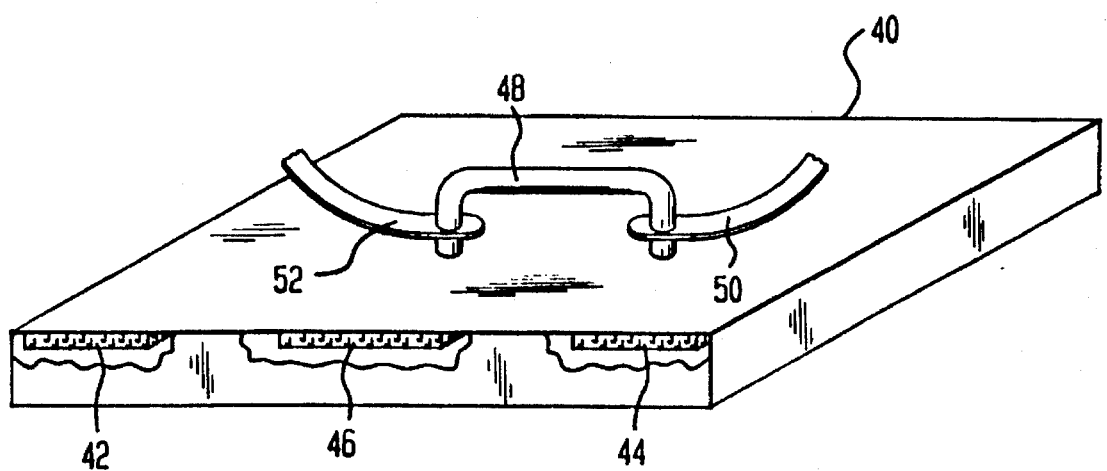
FIG. 5 is a partially cut away diagrammatic perspective representation showing a cover for the stack illustrated in FIGS. 1–4.

With particular reference now to FIG. 5, a stack cover is designated by the numeral 40. Stack cover 40 is dimensioned so as to fit over stack 3.

With continued reference to FIG. 5, a pile member 42 of a loop and pile fastener adhesively adheres to the interior surface of case 40 along one side thereof. Likewise, a pile member 44 adhesively adheres to the interior surface of the case along the opposite side thereof in parallel relation to member 42. A pile member 46 adhesively adheres to the interior surface of case 40 substantially intermediate pile members 42 and 44 and in substantially parallel relationship thereto. In this regard, it will be appreciated that the spacing of pile members 42, 46 and 44 corresponds to the spacing of loop members 34, 38 and 36, respectively, and which pile members 42, 46 and 44 engage loop members 34, 38 and 36, respectively, upon the cover being disposed over stack 3, whereby the cover is maintained on the stack.

Cover 40 may carry a handle 48 on the top surface thereof and handle 48 may carry strap members 50 and 52 which are suitably joined to form a continuous strap attached to handle 48 to facilitate carrying or transporting the covered stack.

Thus, with cover 40 disposed over media storage device case stack 3 and adhering thereto via the engagement of loop members 34, 36 and 38 and pile members 42, 44 and 46, a transportable stack of media storage device cases is provided. An arrangement of this type is particularly advantageous when arranging the several media storage device cases in a particular grouping as to music styles, artists, or any other grouping that may be desired, and is also advantageous in transporting the stack from one place to another, as is most often desireable. The cover is easily removed from the stack by breaking the engagement of the several loop or pile members on the stack and the cover.

It will thus be appreciated that the present invention provides an arrangement wherein a plurality of audio cassette cases may be held and transported in a form of order. The integrity of the stack is maintained at all times and easy access to the contents of the media storage device cases is readily available. Loss of the cases or misplacement thereof as may otherwise occur is prevented, as will be recognized as particularly advantageous.

It will be further appreciated that the several loop members and the several pile members may be interchanged, with the invention thereupon working as well. Fasteners including adhesive backed loop and pile members as herein described are well known in the art and are commercially available.

With the above description of the invention in mind, reference is made to the claims appended hereto for a definition of the scope of the invention.

What is claimed is:

1. An arrangement for retaining and transporting a plurality of audio tape cassette cases, comprising:

a plurality of like cassette cases arranged in a stack in adjacent relationship, including at least two rows of like cases arranged in parallel relationship and each of said rows including an equal number of like cases, each said case having a back and a front;

means for retaining said plurality of like cases in said stack including a first member attached to the stack and spaced so as to extend parallel to one side of one row thereof, a second member attached to the stack and spaced so as to extend along a corresponding side of the other row thereof and substantially parallel to the first member, a third member attached to the stack and spaced so as to extend between the first and second members in substantially parallel relation thereto, said first and second members being attached to the cases in the one and the other rows, respectively, and said third member being attached to each of the cases in the one and the other rows, each said first member, said second member and said third member each being one component of a two-component fastener; said retaining means being effective for permitting selected cases to be displaced from adjacent cases, whereby cassettes stored in the selected cases are easily removable from said selected cases;

said two-component fastener having a loop member and a pile member, with at least said first and second members each having the same type component of the loop and pile members and each of the first, second and third members having adhesive surface by which each of said first, second and third members is attached to the stack and having an exposed surface opposite the adhesive surface, said exposed surface being effective as the one type component of the fastener including loop and pile members;

a cover which is sized to fit over the stack and having an inside surface and an outside surface;

a fourth member of a loop and pile member of the opposite type component as said first and second members, said fourth member attached to the inside surface of the cover and extending along one side thereof;

a fifth member of a loop and pile member of the opposite type component as said first and second members, said fifth member attached to the inside surface of the cover and extending along an opposite side thereof substantially parallel to said fourth member; and a sixth member of a loop and pile member of the opposite type component as said third members, said sixth member attached to the inside surface of the cover between the fourth and fifth members and extending substantially parallel thereto.

2. The arrangement as described by claim 1, wherein the first, second and third members are the same type components and the fourth, fifth and sixth members each include:

the opposite type component member of the fastener having loop and pile members, with each said other member having the same member of the loop and pile members.

3. The arrangement as described by claim 2, wherein:

each of said fourth, fifth and sixth members has an adhesive surface by which said member is attached to the inside surface of the cover and an exposed surface opposite the adhesive surface, said exposed surface being effective as the opposite type component member of the fastener including loop and pile members.

4. The arrangement as described by claim 3, wherein:

the fourth, fifth and sixth members are in corresponding spaced relation with the first, second and third members, respectively, whereby the exposed surfaces of the correspondingly spaced members engage to retain the cover on the stack.

5. The arrangement as described by claim 4, including:

carrying means attached to the outside surface of the cover.

6. The arrangement as described by claim 1, wherein:

the backs of the cases face outwardly; and the fronts of the cases which open for removal of the contents of the cases face inwardly.

* * * * *